United States Patent [19]

Miyabayashi

[11] Patent Number: 4,810,592
[45] Date of Patent: Mar. 7, 1989

[54] THIN FILM MAGNETIC RECORDING MEDIUM AND PRODUCING METHOD OF THE SAME

[75] Inventor: Takeshi Miyabayashi, Nagoya, Japan

[73] Assignee: Brother Kogyo Kabushiki Kaisha, Japan

[21] Appl. No.: 46,265

[22] Filed: May 4, 1987

[30] Foreign Application Priority Data

May 6, 1986 [JP] Japan ................ 61-103499

[51] Int. Cl.⁴ ............................ B32B 15/01
[52] U.S. Cl. .................. 428/668; 428/928; 428/669; 428/673; 428/678; 428/694; 428/900
[58] Field of Search ........... 428/669, 673, 686, 928, 428/694, 900

[56] References Cited

U.S. PATENT DOCUMENTS

| | | |
|---|---|---|
| 3,150,939 | 9/1964 | Weinner. |
| 3,350,180 | 10/1967 | Croll. |
| 3,520,664 | 11/1966 | York. |
| 4,079,169 | 3/1978 | Nigh et al. ............ 428/636 |
| 4,210,946 | 7/1980 | Iwasaki et al. ........ 360/131 |
| 4,438,066 | 3/1984 | Aboaf et al. ........... 420/435 |
| 4,552,820 | 11/1985 | Lin et al. ............... 428/611 |
| 4,610,935 | 9/1986 | Kumasaka et al. ..... 428/632 |
| 4,621,030 | 11/1986 | Wesaka et al. ......... 428/607 |
| 4,631,202 | 12/1986 | Opfer et al. ............ 427/131 |
| 4,636,448 | 1/1987 | Morita et al. .......... 428/607 |
| 4,654,276 | 3/1987 | Ahlert et al. ........... 428/641 |
| 4,657,824 | 4/1987 | Howard .................. 428/611 |

OTHER PUBLICATIONS

Gill et al., "The Growth Characteristics Of Two-Beam Sputtered CoCr Flame on Ta Isolation Layers", IEEE Trans. on Magnetics, vol. MAG-20, No. 5, Sep. 1984, p. 776.

Primary Examiner—George F. Lesmes
Assistant Examiner—J. Monroe
Attorney, Agent, or Firm—Kane, Dalsimer, Sullivan, Kurucz, Levy, Eisele and Richard

[57] ABSTRACT

Disclosed is a thin film magnetic recording medium which comprises a substrate and a magnetic layer formed on the substrate, the magnetic layer including a lamination composed of at least a grain size suppression film and a magnetic film formed on each of opposite sides of the grain size suppression film, the grain size suppression film being made of at least a grain size suppressing metal, the magnetic film being made of a cobalt magnetic material, and further disclosed is a method of producing a thin film magnetic recording medium which comprises the step of: dipping a substrate in an electroless plating solution for depositing a crystal of a cobalt magnetic material on the substate to form a first crystal film thereon; adding a metallic salt solution for suppressing growth of a grain size of a crystal structure into the electroless plating solution at least once after a predetermined period of time has passed from the dipping of the substrate under the condition that the substrate is dipped in the electroless plating solution to thereby form a grain size suppression film on the first crystal film; and forming then a second crystal film having a crystal structure of a small grain size on the grain size suppression film.

4 Claims, 3 Drawing Sheets

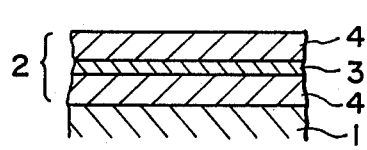
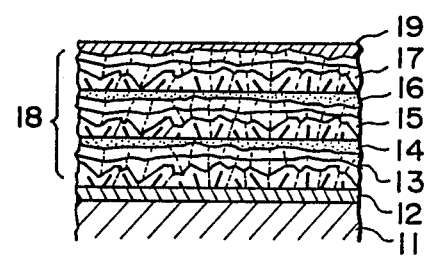
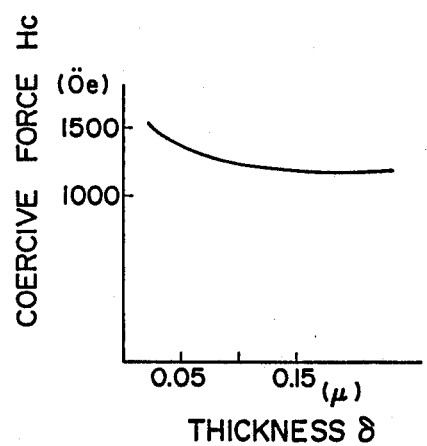

THIN FILM MAGNETIC RECORDING MEDIUM AND PRODUCING METHOD OF THE SAME

BACKGROUND OF THE INVENTION

1. Field of the Invention

The present invention relates to a thin film magnetic recording medium and a method of producing the same.

2. Description of the Prior Art

Nowadays, in a magnetic recording apparatus, the improvement of the recording density of magnetic recording media has been considered as the most important technical subject. The main parameters for improving the recording density of recording media are the coercive force Hc, the residual magnetic flux Br, and the magnetic layer thickness.

There is the following relation among those parameters and electromagnetic characteristics.

$$W \propto (Br/Hc)^{\beta} \cdot \delta^{\alpha}$$

$$E \propto Br \cdot (Hc/Br)^{\beta} \cdot \delta^{\alpha}$$

$$\alpha = 0.85 - 0.50$$

$$\beta = 0.15 - 0.50$$

where W and E represet the width of a reproduced waveform and the reproducing output of a magnetic head respectively.

According to the above-mentioned relation, it is understood that in order to improve the recording density of a magnetic recording medium, it is necessary to make the waveform width W small while suppressing the lowering of the reproducing output E as small as possible.

In order to make the waveform width W small, it is necessary to make both the ratio (Br/Hc) and the magnetic layer thickness δ small. At that time, in order to prevent the lowering of the reproducing output E, it is desirable to make the product of the residual flux Br and the magnetic layer thickness δ larger, and particularly in a thin film magnetic recording medium, it is desirable to make the magnetic layer thickness δ small while making the residual flux Br as well as the coercive force Hc large. On the basis of this point of view, conventional, magnetic recording media such as magnetic disks, and the like, have been manufactured.

A trial for making the coercive force Hc large has been performed in order to make the recording density higher in thin film magnetic recording media. In such a trial, however, if the coercive force Hc is to be made large, the magnetic layer thickness δ is required to be small, resulting in a problem that the magnetic layer thickness becomes uneven. There is a further problem that making the magnetic layer thickness δ small may cause reduction in the reproducing output E unless the residual flux Br is made large.

A cause of the fact that the coercive force Hc becomes small when the magnetic layer thickness δ is large is considered to exist in the crystal structure of the cobalt material such as cobalt-phosphorus or the like forming the magnetic layer. That is, a change in grain size D of a crystal 1 such as cobalt-phosphorus, or the like, in the growing process thereof, as shown in FIG. 5, is considerd as a cause of the above-mentioned fact. As shown in FIG. 6, it is considered that the smaller the grain size D is the higher the coercive force Hc is made unless the grain becomes amorphous. That is, it is considered that the crystal structure has the maximum coercive force Hc when the grain size D is about 50 Å.

SUMMARY OF THE INVENTION

It is therefore an object of the present invention to solve the foregoing problems in the prior art.

It is another object of the present invention to provide a magnetic recording medium having high coercive force as well as extremely high recording density without making a magnetic layer extremely thin.

It is another object to provide a method of producing magnetic recording media of the kind as described above in the first object.

In order to attain the above objects, according to a first aspect of the present invention, the thin film magnetic recording medium comprises a substrate and a magnetic layer formed on the substrate, the magnetic layer including a lamination composed of at least a grain size suppression film and a magnetic film formed on each of opposite sizes of the grain size suppression film, the grain size suppression film being made of at least a grain size suppressing metal, the magnetic film being made of a cobalt magnetic material.

In the thus arranged thin film magnetic recording medium, the grain size in the crystal structure of each of the magnetic films formed on the opposite sides of the grain size suppression film is made smaller by the existence of the grain size suppression film, in comparison with the case where the magnetic films are fromed under the condition of existence of no grain size suppression film. As the result, a thin film magnetic recording medium having high coercive force can be obtained.

According to a second aspect of the present invention, the method of producing a thin film magnetic recording medium comprises the step of: dipping a substrate in an electroless plating solution for depositing a crystal of a cobalt magnetic material on the substate to form a first crystal film thereon; adding a metallic salt solution for suppressing growth of a grain size of a crystal structure into the electroless plating solution at least once after a predetermined period of time has passed from the dipping of the substrate under the condition that the substrate is dipped in the electroless plating solution to thereby form a grain size suppression film on the first crystal film; and forming then a second crystal film having a crystal structure of a small grain size on the grai size suppression film.

According to the method, when the metallic salt solution for suppressing growth of a grain size in a crystal structure is added into the electroless plating solution in which the substrate has been dipped, the grain size suppression film is deposited on the first crystal film of a cobalt magnetic material which has been deposited on the substrate in the electroless plating solution so as to stop growth of the first crystal film. After completion of formation of the grain size suppression film is completed to be deposited, the second crystal film of the cobalt magnetic material is newly deposited on the grain size suppression film. Thus, the second cobalt magnetic crystal film having a small grain size is formed on the first cobalt magnetic crystal film on the substrate before the grain size of the first cobalt magnetic crystal film becomes large, so that the magnetic layer having high coercive force can be obtained.

BRIEF DESCRIPTION OF THE DRAWINGS

The above and other objects, features, and advantages of the present invention will be more apparent from the following description with reference to the accompanying drawings, in which:

FIG. 1 is a sectional view for explaining the basic structure of the thin film magnetic recording medium according to the present invention;

FIG. 2 is a sectional view for explaining the structure of an embodiment of the thin film magnetic recording medium according to the present invention;

FIG. 3 is a graph showing the relation of the coercive force versus the thickness of the magnetic layer in the thin film magnetic recording medium according to the present invention;

DETAILED DESCRIPTION OF PREFERRED EMBODIMENT

Figure 4:
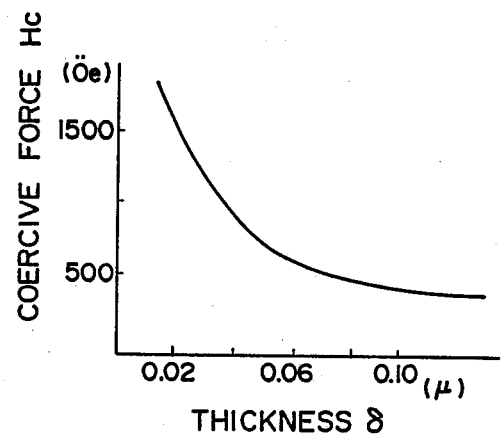
FIG. 4 is a graph showing the relation of the coercive force versus the thickness of the magnetic layer in the conventional thin film magnetic recording medium.
Figure 6:
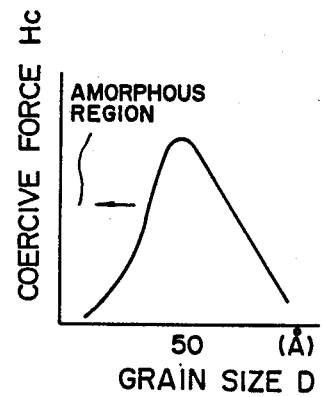
FIG. 6 is a graph showing the relation of the grain size versus the coercive force.
Figure 5:
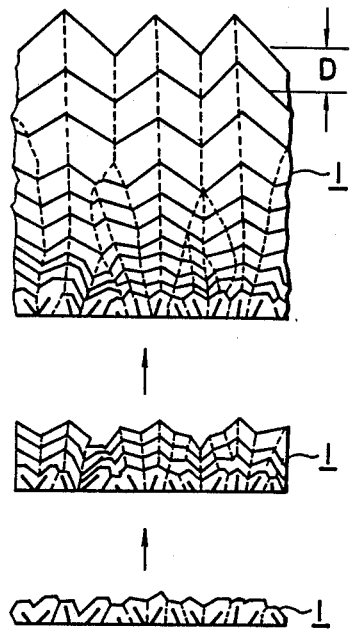
FIG. 5 is a view for explaining a growing process of the crystal in FIG. 5.

Referring to the drawings, the present invention will be described in detail.

FIG. 1 is a schematic sectional view showing the basic structure of the magnetic recording medium according to the present invention. In FIG. 1, the thin film magnetic recording medium comprises a substrate 1 and a magnetic layer 2 formed on the substrate 1. The magnetic layer 2 has a lamination composed of a grain size suppression film 3 and magnetic films 4 and 4 formed on the respective opposite surfaces of the grain size suppression film 3. The grain size suppression film 3 is made of a grain size suppressing metal or a mixture of a grain size suppressing metal and a cobalt magnetic material, and the respective magnetic film 4 is made of a cobalt magnetic material.

FIG. 2 is a sectional view showing the structure of an embodiment of the thin film magnetic recording medium according to the present invention. In FIG. 2, a non-magnetic layer 12 is formed on a substrate 11 made of aluminium (A1). In this embodiment, the non-magnetic layer 12 is formed of nickel-phosphorus (Ni-P) through a known thin film forming method. The material of the substrate 11 is not limited to aluminium but the substrate 11 may be made of synthetic resin or any other suitable material, such as polysulfone, polyisoimide, polyimide, or the like. The material of the non-magnetic layer 12 is not limited to nickel-phosphorus (Ni-P) but the non-magnetic layer 12 may be made of any other non-magnetic material.

A magnetic film 13 is formed on the non-magnetic layer 12, the magnetic film 13 being constituted by a crystal film made of a magnetic material consisting of cobalt-phosphorus (Co-P). The crystal structure of the cobalt-phosphorus (Co-P) forming the magnetic film 13 has a small grain size.

A grain size suppression film 14 made of silver (Ag) acting as a grain size suppressing metal is laminated on the magnetic film 13 so that the grain size suppression film 14 functions to make the magnetic film 13 have a crystal structure of a small grain size, that is, to function to stop the growing of crystal of the magnetic film 13. A magnetic film 15 is formed on the suppression film 14.

The magnetic film 15 is constituted by a crystal film made of a magnetic material consisting of cobalt-phosphorus (Co-P) similarly to the magnetic film 13 and has a crystal structure of a small grain size.

A grain size suppression film 16 which is the same as the grain size suppression film 14 is laminated on the magnetic film 15 and a magnetic film 17 constituted by a crystal film having a crystal structure of a small grain size similarly to the magnetic films 13 and 15 is formed on the grain size suppression film 16. Thus, a magnetic layer 18 is composed of the magnetic film 13, the grain size suppression film 14, the magnetic film 15, the grain size suppression film 16, and the magnetic film 17.

A known protective layer 19 is formed on the magnetic layer 18.

Next, a method of producing the thin film magnetic recording medium having such a structure as described above will be described.

First, the substrate 11 of aluminium (Al) having the non-magnetic layer 12 of nickel-phosphorus (Ni-P) formed thereon is dipped into an electroless plating solution so that the magnetic film 13 is formed on the non-magnetic layer 12 through electroless plating. That is, the electroless plating solution consists of:

Cobalt sulfate [$CoSO_4$]: 10 g/l
Sodium hypophosphite [$NaH_2PO_2$]: 20 g/l
Ammonium sulfate [$(NH_4)_2SO_4$]: 80 g/l
Tartaric acid (complexing agent): 200 g/l
pH 10.0
Temperature 80° C.

The substrate 11 is dipped into the plating solution so that a crystal film (the magnetic film 13) of cobalt-phosphorus (Co-P) is formed on the surface of the non-magnetic layer 12 through the electroless plating. The crystal grows to make the grain size large as the dipping time passes. Accordingly, in order to make coercive force Hc large, it is necessary to stop the growing of the crystal before the grain size in the crystal structure of the crystal film becomes large.

The speed of deposition of the cobalt-phosphorus crystal through the electroless plating depends on the concentration of cobalt surface, and therefore the instantaneous value of the crystal grain size in the process of crystal growth can be extremely easily obtained if the plating speed is constant. As a result, the proper timing for stopping the growing of the crystal can be obtained theoretically or experimentally in advance. Accordingly, in the embodiment, not only the plating speed is always monotored in plating by using a monitoring device so as to control the concentration of the plating solution to a constant value, but the period of time T1 determining a point in time when the growing of the crystal is to be stopped (30 seconds in the embodiment) before the grain size of the crystal film becomes so large to lower the coercive force Hc, is set in advance.

Of course, in order to control the electroless plating speed to a constant value, not only the quantity of the sodium hypophosphite acting as a reducing agent and the pH of the solution are automatically controlled, but the concentration of the complexing agent are controlled by monitoring them by the use of analyzing devices.

When the predetermined period of time T1 has passed after the substrate is dipped into the electroless plating solution, the process is started to form the grain size suppression film 14 for stopping the growing of the crystal film.

The grain size suppression film 14 is formed by adding a metallic salt solution into the electroless plating solution. The metallic salt solution contains:

Ethylenediamine-tetraacetic silver [EDTA.Ag] as silver: 5 ppm
Sodium iodide [NaI]: 5 ppm
Sodium cyanide [NaCN]: 100 ppm The silver salt solution is added to the electroless plating solution and the mixed solution is stirred, so that the grain size suppression film 14 made of silver (Ag) is deposited on the crystal film (the magnetic film 13) from the metallic salt solution.

In the metallic salt solution, the sodium iodide is used to control the plating speed of silver by means of special absorption by anion seeds, and the solium cyanide is used as a dissolution promoter of the ethylenediamine-tetraacetic silver.

Accordingly, a plating alloy of cobalt-silver-phosphorus (Co-Ag-P), that is, the grain size suppression film 14 is formed on the surface of the crystal film, that is, the magnetic film 13, so that the formation of the crystal film of cobalt-phosphorus is stopped.

In this case, the grain size suppression film 14 is formed in the electroless plating solution, so that it is considered that the grain size suppression film 14 is constituted by a film of cobalt-silver-phosphorus or by a film of only silver. In any case, the fact is true that the growing of the crystal film can be before the grain size of the crystal film, that is, the magnetic film 13, becomes large. The thus obtained cobalt-silver-phosphorus compound was composed of 77% cobalt, 20% silver, and 3% phosphorus. At that time, when the silver content is made equal to or more than 10%, good influence is given onto the magnetic characteristics such as coercive force and so on. The thickness and the forming speed of the grain size suppression film 14 are determined depending on the concentration and quantity of the silver salt solution.

After the completion of forming the grain size suppression film 14 with the addition of the silver salt solution, the electroless plating is performed again by the electroless plating solution. At that time, the electroless plating speed is lowered by the addition of the silver salt solution into the electroless plating solution, but the respective quantities of sodium hypophosphite and the complexing agent, the value of pH, the concentration of cobalt ions, and the bath temperature are controlled by the foregoing monitoring and analyzing devices.

The crystal film, that is, the magnetic film 15, made of cobalt-phosphorus is formed directly on the grain size suppression film 14 from zero through the electroless plating. That is, the crystal film grows from a small grain size crystal structure to a large grain size one. Similarly to the case of forming the magnetic film 13, in order to form the crystal film having a small grain size, the silver salt solution is added into the electroless plating solution before the grain size becomes large. The period of time T2 determining a point in time when the silver salt solution is to be added (30 seconds in the embodiment) is determined in advance.

When the predetermined time T2 has passed after the start of formation of the crystal film, that is, the magnetic film 15, the foregoing silver salt is added again, so that the grain size suppression film 16, which is the same as the grain size suppression film 14, is formed on the crystal film, that is, the magnetic film 15. After the grain size suppression film 16 has been formed, the crystal film, that is, the magnetic film 17, is formed in the same process as that of the magnetic film 15, thus ending the plating step.

After the magnetic layer 18 constituted by the magnetic films 13, 15, and 17 and the grain size suppression films 14 and 16 has been formed, the protective layer 19 is formed on the magnetic layer 18 through a known method. Thus, the producing of the thin film magnetic recording medium is completed.

Thus, in the embodiment, a silver salt solution is added into the electroless plating solution before the crystal structure of the magnetic film 13 grows to have a large grain size in the process of forming the magnetic film 14 to thereby form the grain size suppression film 14 to stop the growth of the magnetic film 13 so that the magnetic film 15 of a small grain size is newly formed on the grain size suppression film 14, and then, similarly to this, a silver salt solution is further added into the electroless plating solution before the crystal structure of the magnetic film 15 grows to have a large grain size in the process of forming the magnetic film 15 to thereby form the grain size suppression film 16 to stop the growth of the magnetic film 15 so that the magnetic film 17 of a small grain size is newly formed on the grain size suppression film 16. Thus, the magnetic layer 18 can be formed of cobalt-phosphorus faving a crystal structure of a small grain size.

A test was made as to the relation of the coercive force Hc versus the thickness δ of the magnetic layer 18 in the magnetic recording medium formed through the method described above according to the present invention, and the result was obtained as shown in FIG. 3. Thus, the result proves that even if the thickness δ of the magnetic layer 18 is made thick, it is possible to obtain the extremely higher coercive force Hc than that of the conventional layer although the coercive force Hc is reduced a little.

Accordingly, it is possible to manufacture magnetic recording media having extremely high coercive force Hc without making the thickness δ of the magnetic layer small and without requiring a high thin-film forming technique, unlike the conventional case.

According to the present invention, the periods of time T1 and T2 for determining the point in time when the silver salt solution is to be added are suitably changed in accordance with the respective thicknesses of the magnetic films 13 and 15, which are determined on the basis of the allowable grain size of the crystal structure, and the concentration of the electroless plating solution. Thus, the periods of time T1 and T2 are determined experimentally or theoretically in advance prior to carrying out of the method.

Although the silver salt solution is added twice to form the three magnetic films 13, 15, and 17 in the embodiment, the number of the times of addition of the silver salt solution is not limited to this, but the method according to the invention may be carried out by the addition of silver salt solution once or more in accordance with the thickness of the magnetic layer 18, the grain size of the respective magnetic film, and so on. Being carried out by use of the silver salt solution in the embodiment, the method according to the present invention may be carried out by use of any other metallic salt solution.

Further, being made of cobalt-phosphorus in the embodiment, the magnetic films 13, 15, and 17 may be made of any other cobalt magnetic material such as of cobalt-boron (Co-B), cobalt-tungsten (Co-W), cobalt-nickel (Co-Ni), or the like.

Although an optimum result could be obtained under the condition that the temperature and pH of the electroless plating solution were selected to be 80° C. and 10 respectively in the embodiment, the condition is not limited to this but may be suitably changed within a range where the respective magnetic films can be formed.

Although it is considered that the coercive force can be made maximum when the grain size is selected to be about 50 Å in the crystal structure of the respective magnetic films 13, 15, and 17, the grain size is not limited to this but the present invention may be carried out with the grain size suitably changed within a range without departing from the scope of the present invention.

As described above, high coercive force can be provided in a thin film magnetic recording medium to thereby make the recording density high without making magnetic layer extremely thin according to a first aspect of the present invention, and magnetic films having a crystal structure of a small grain size can be formed according to a second aspect of the present invention, so that it is possible to extremely easily manufacture magnetic recording media having high coercive force without making the thickness of the magnetic layer extremely thin.

I claim:

1. A thin film magnetic recording medium, which comprises; a sub-strate and a magnetic layer formed on said substrate, said magnetic layer including a lamination composed of at least a grain size suppression film and a magnetic film formed on each of opposite sides of said grain size suppression film, said grain size suppression film being made of a mixture of at least a grain size suppressing metal and a cobalt magnetic material, said magnetic film being made of a cobalt magnetic material.

2. A thin film magnetic recording medium according to claim 1, in which said cobalt magnetic material is cobalt-phosphorus.

3. A thin film magnetic recording medium according to claim 1, in which said grain size suppressing metal is silver.

4. A thin film magnetic recording medium according to claim 1, in which a grain size in a crystal structure of said magnetic film is 50 Angstrom at maximum.

* * * * *